US012058955B2

(12) United States Patent
Gray et al.

(10) Patent No.: US 12,058,955 B2
(45) Date of Patent: Aug. 13, 2024

(54) AIR BOOM SPREADER FOR PARTICULATE MATERIAL

(71) Applicant: Salford Group Inc., Salford (CA)

(72) Inventors: Geof J. Gray, Burford (CA); John Mark Averink, Norwich (CA); Bradley William Baker, Stratford (CA); Jesse Abram Dyck, London (CA); Chad Derek Pasma, Beachville (CA); Simon Goveia, Mossley (CA); Christopher Michael Poppe, Mitchell (CA); Troy Michael Straatman, Alvinston (CA); Adam Peter Lehman, Kenilworth (CA)

(73) Assignee: Salford Group Inc., Salford (CA)

( * ) Notice: Subject to any disclaimer, the term of this patent is extended or adjusted under 35 U.S.C. 154(b) by 174 days.

(21) Appl. No.: 17/946,179

(22) Filed: Sep. 16, 2022

(65) Prior Publication Data

US 2023/0013553 A1    Jan. 19, 2023

Related U.S. Application Data

(62) Division of application No. 17/286,951, filed as application No. PCT/CA2020/050970 on Jul. 13, 2020, now Pat. No. 11,503,758.

(Continued)

(51) Int. Cl.
*A01C 7/08*     (2006.01)
*A01C 15/04*    (2006.01)

(52) U.S. Cl.
CPC .............. *A01C 7/082* (2013.01); *A01C 15/04* (2013.01)

(58) Field of Classification Search
None
See application file for complete search history.

(56) References Cited

U.S. PATENT DOCUMENTS 4,569,486 A * 2/1986 Balmer .................. A01C 15/04
                                                  239/522
4,852,809 A * 8/1989 Davis ..................... A01C 15/04
                                                  239/654

(Continued)

FOREIGN PATENT DOCUMENTS

CA         3010384 A1    9/2018

OTHER PUBLICATIONS

International Search Report and Written Opinion dated Sep. 22, 2020 on PCT/CA2020/050970.

*Primary Examiner* — Joseph A Dillon, Jr.
(74) *Attorney, Agent, or Firm* — Brunet & Co. Ltd.; Robert Brunet; Hans Koenig

(57) ABSTRACT

An air-boom spreader has a hopper for containing particulate material, a metering device having a plurality of sluices, a plurality of outlets transversely spaced-apart on a boom in a direction perpendicular to the direction of travel of the spreader, and a plurality of air lines connecting the plurality of sluices to the plurality of outlets for conveying the particulate material in an air stream from the plurality of sluices to the plurality of outlets. The spreader has more than twice as many outlets as sluices, and the plurality of outlets has an innermost outlet, an outermost outlet and at least three other outlets between the innermost outlet and the outermost outlet whereby each of the innermost outlet and the outermost outlet are supplied with half as much of the particulate material as each of the at least three other outlets.

10 Claims, 15 Drawing Sheets

Related U.S. Application Data

(60) Provisional application No. 62/908,132, filed on Sep. 30, 2019.

(56) References Cited

U.S. PATENT DOCUMENTS

| | | | |
|---|---|---|---|
| 5,028,009 A | 7/1991 | Takata | |
| 5,052,627 A * | 10/1991 | Balmer | A01C 15/122 239/655 |
| 5,125,583 A * | 6/1992 | Strand | A01M 9/003 406/79 |
| 5,267,696 A * | 12/1993 | Balmer | A01M 11/00 239/662 |
| 5,775,585 A * | 7/1998 | Duello | A01C 15/04 239/654 |
| 5,950,933 A * | 9/1999 | Balmer | A01C 15/04 239/655 |
| 9,232,690 B2 * | 1/2016 | Kowalchuk | A01C 21/00 |
| 9,265,193 B2 * | 2/2016 | Snyder | A01B 76/00 |
| 9,488,512 B2 * | 11/2016 | Hossain | G01F 1/88 |
| 10,028,429 B2 * | 7/2018 | Roberge | A01C 7/081 |
| 10,143,129 B2 | 12/2018 | Roberge et al. | |
| 10,813,280 B2 * | 10/2020 | Gray | A01C 15/006 |
| 11,219,203 B2 * | 1/2022 | Gray | A01C 15/16 |
| 11,310,955 B2 * | 4/2022 | Ruppert | A01M 9/003 |
| 11,343,958 B2 * | 5/2022 | Glendenning | F04F 1/18 |
| 2014/0048612 A1 * | 2/2014 | Snyder | A01B 76/00 239/71 |
| 2014/0263409 A1 * | 9/2014 | Wagers | A01C 7/081 222/1 |
| 2015/0216108 A1 * | 8/2015 | Roth | A01C 7/006 239/1 |
| 2016/0113191 A1 * | 4/2016 | Rosengren | A01C 21/005 701/50 |
| 2016/0205867 A1 * | 7/2016 | Montag | A01C 7/082 |
| 2018/0343792 A1 | 12/2018 | Roberge et al. | |
| 2019/0021214 A1 | 1/2019 | Roberge et al. | |
| 2019/0022608 A1 | 1/2019 | Roberge et al. | |
| 2021/0205832 A1 * | 7/2021 | Ruppert | A01C 15/04 |
| 2023/0133821 A1 * | 5/2023 | Wien | A01C 7/084 111/174 |

* cited by examiner

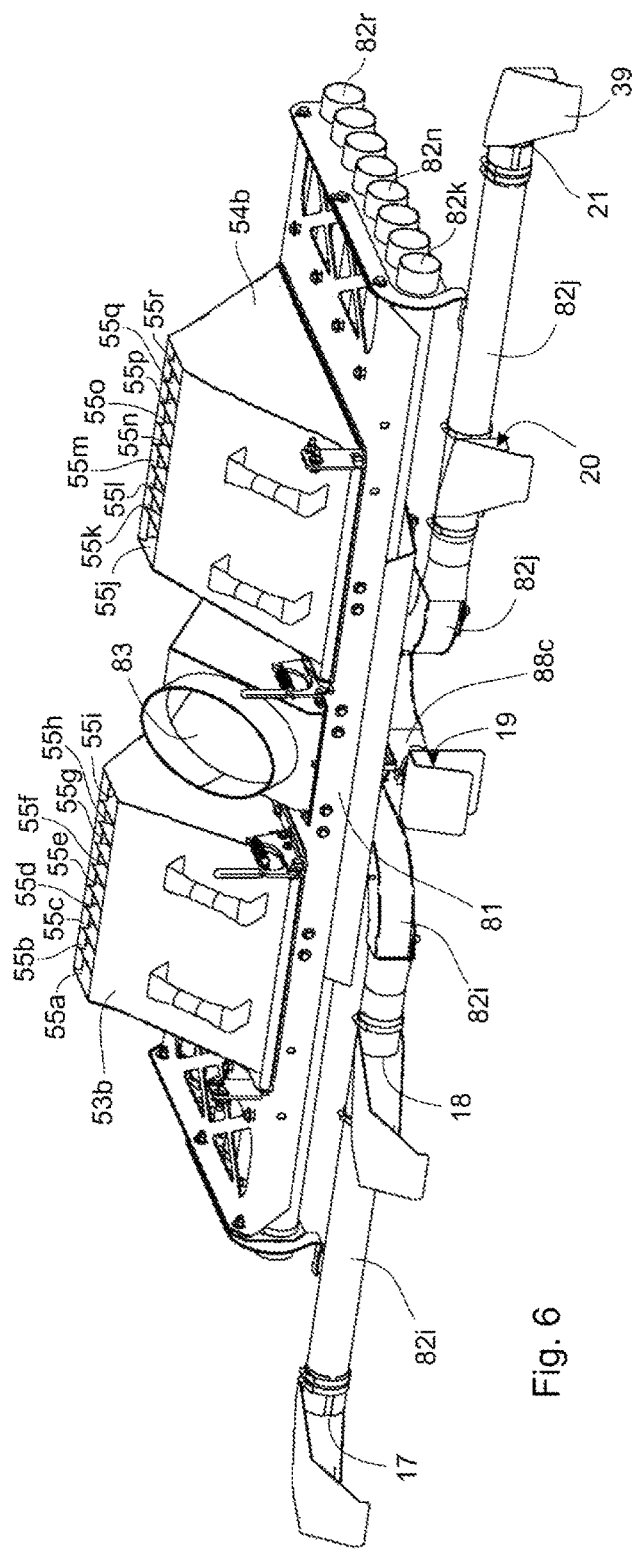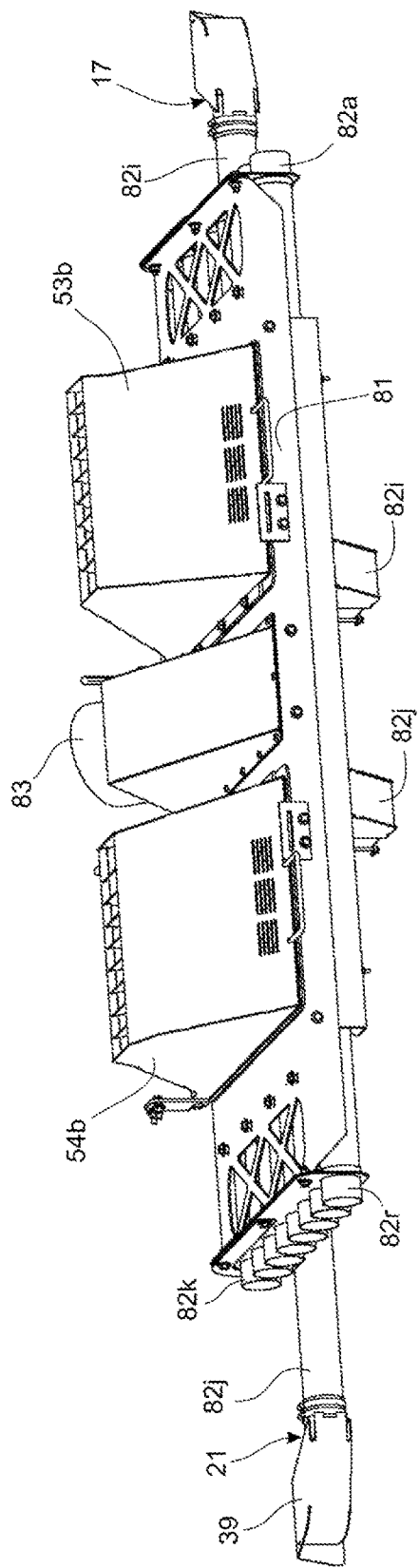

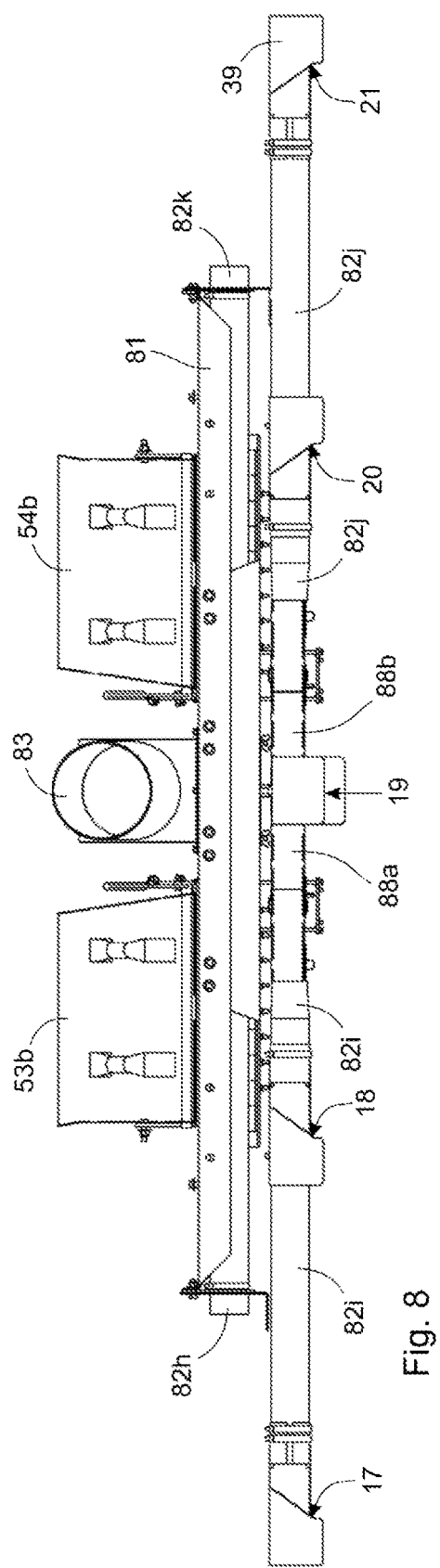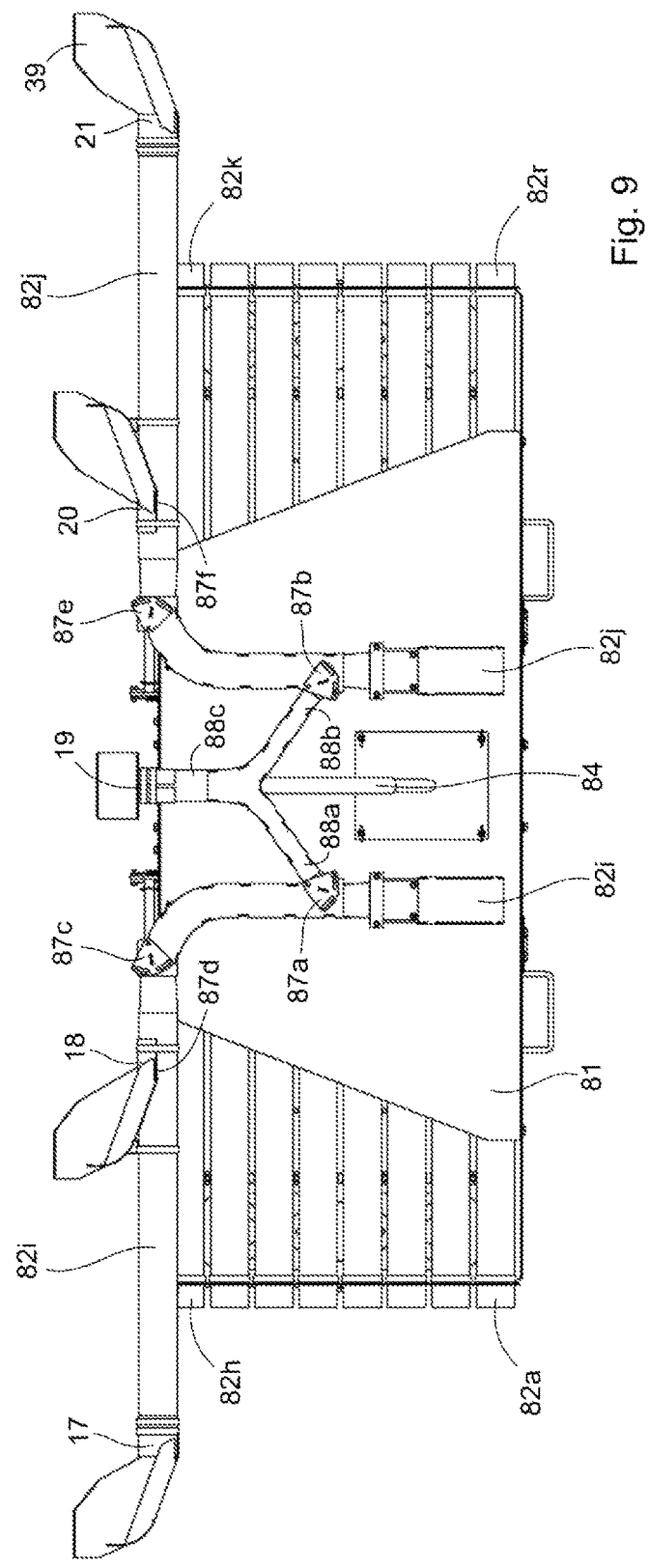

AIR BOOM SPREADER FOR PARTICULATE MATERIAL

CROSS-REFERENCE TO RELATED APPLICATIONS

This application is a divisional of U.S. patent application Ser. No. 17/286,951 filed Apr. 20, 2021, which is a national phase entry of International Patent Application PCT/CA2020/050970 filed Jul. 13, 2020, which claims the benefit of U.S. Provisional Patent Application Ser. No. 62/908,132 filed Sep. 30, 2019, the entire contents of all of which are herein incorporated by reference.

FIELD

This application relates to agriculture, in particular to a method and an apparatus for applying solid agricultural product to a field.

BACKGROUND

In modern agriculture, many crops (e.g. corn) are often planted by seeding a field with seed in evenly-spaced parallel rows. Seeding a field generally involves towing a seeding implement behind a towing vehicle (e.g. a tractor) such that the wheels of the towing vehicle and the wheels of the seeding implement follow the same path, and the seeds are planted in crop rows spaced-apart by a distance such that the wheels are between crop rows. The seeding implement generally has a plurality of transversely spaced-apart seed outlets so that a plurality of crop rows may be planted at the same time in a single swath as the towing vehicle drives in a driving line in one direction on the field. Currently, all such seeding implements comprise an even number of seed outlets, for example 12, 16, 18, 24, 36, 48, etc. seed outlets. When the towing vehicle and the seeding implement arrive at the end of the field, the towing vehicle and the seeding implement are shifted over and driven in a new driving line in the opposite direction to plant another swath of crop rows. The new driving line is chosen so that the spacing between all of the parallel crop rows in the field remains constant across the field. The new driving line is determined based on the location in the field of the previous driving line and on the number and spacing of seed outlets on the seeding implement. The driving lines may be stored as coordinates in a global positioning system (GPS) for future reference and/or for automating the planting.

After planting, it is often desirable to apply post-planting product (e.g. fertilizer, micronutrients, etc. or mixtures thereof) in between the crop rows (i.e. mid-rows). A different implement but the same towing vehicle are often used for application of post-planting product. Because axle width of the towing vehicle remains unchanged, to avoid driving on the crop rows during post-planting product application, the towing vehicle is driven on the same driving lines as was driven during planting. In order to apply post-planting product between the crop rows under such conditions, the implement used to apply post-planting product has a plurality of product outlets spaced-apart by substantially the same or a similar distance as the seed outlets on the seeding implement, but the outlets on the post-planting implement are transversely offset with respect to a centerline of the towing vehicle by an amount equal to about half the spacing distance. Alternative to towing a post-planting implement, a self-propelled vehicle may be used to apply post-planting product to the field. Nevertheless, the self-propelled vehicle should drive between rows and it is desirable for the self-propelled vehicle to drive on the same rows as the towing vehicle that towed the seeding implement in order to prevent excessive compaction. Such a practice is called tramlining where all traffic drives in same rows as much as possible.

Unfortunately, such a practice results in some mid-rows receiving twice the desired amount of post-planting product, or some mid-rows receiving no post-planting product, or some mid-rows receiving twice the desired amount of post-planting product and others receiving none. The problem could be mitigated by shifting every second driving line during application of the post-planting product. However, shifting every second driving line is generally undesirable due to the difficulty in feeding from a fixed set of endless belts or meter rollers into a sluiced metering device and having a moveable boom to switch between rows. Such a solution requires many more moving parts, which can jam, wear out from movement and experience other problems associated with moving parts.

Recently, an apparatus and method have been developed in which the outlets of a particulate material spreader are configured to receive the particulate material from a metering device and to dispense an amount of the particulate material to mid-rows between crop rows on a field such that the plurality of outlets dispenses half the amount of particulate material to an outermost mid-row compared to the amount of particulate material dispensed to the other mid-rows (see International Patent Publication WO 2018/170594 published Sep. 27, 2018, the entire contents of which is herein incorporated by reference). Such a configuration permits delivering the same amount of particulate material to each mid-row as the towing vehicle tramlines through a field. However, in air-boom spreaders with a configuration of air lines as shown in WO 2018/170594, as the total span of the boom exceeds 60 feet (about 18.5 meters), insufficient distribution of particulate material to certain outlets, e.g. the outermost outlets, may occur at the typical particle distribution rates and vehicle speeds used, i.e. 400 lb/acre at 14 mph or 560 lb/acre at 10 mph. A goal of using longer booms (e.g. 90-foot total boom span) is to distribute particulate material at a higher rate, e.g. 1200 lb/acre at a vehicle speed of 10 mph, in order to perform broadcasting and row cropping. However, increasing the particle distribution rate in such a way may also lead to line plugging, particularly at the innermost outlets, when a boom having a total span in excess of 60 feet is used.

There still remains a need for a post-planting implement, particularly an air-boom spreader with a total boom span of greater than 60 feet, and a method for applying the same amount of a particulate material to all the mid-rows between crop rows while the spreader is driven on the same driving lines used for planting the crop rows.

SUMMARY

There is provided an air-boom spreader for spreading particulate material on a field, the spreader comprising: a hopper for containing the particulate material; a metering device comprising a plurality of sluices, the metering device receiving the particulate material from the hopper and partitioning the particulate material into the plurality of sluices; a plurality of outlets transversely spaced-apart on a boom in a direction perpendicular to the direction of travel of the spreader; and, a plurality of air lines connecting the plurality of sluices to the plurality of outlets for conveying the particulate material in an air stream from the plurality of sluices to the plurality of outlets, wherein there are more than twice as many outlets as there are sluices, and wherein the plurality of outlets comprises an innermost outlet, an outermost outlet and at least three other outlets between the innermost outlet and the outermost outlet whereby each of the innermost outlet and the outermost outlet are supplied with half as much of the particulate material as each of the at least three other outlets.

There is also provided an air-boom spreader for spreading particulate material to mid-rows between crop rows on a field, the spreader comprising: a hopper for containing the particulate material; a metering device configured to receive the particulate material from the hopper; a plurality of outlets transversely spaced-apart on a boom in a direction perpendicular to a direction of travel of the spreader and configured to receive the particulate material from the metering device and to dispense the particulate material to the mid-rows, the plurality of outlets comprising a pair of distal-most outlets in relation to the metering device, the pair of distal-most outlets comprising an outermost outlet and a penultimate outlet, an innermost outlet in relation to the metering device, and a pair of interior outlets situated on the boom between the pair of distal-most outlets and the innermost outlet; and, a plurality of air lines connecting the metering device to the plurality of outlets for conveying the particulate material in an air stream to the plurality of outlets, the plurality of air lines comprising a first air line connecting the metering device to the pair of distal-most outlets, the metering device supplying 1.5 units of the particulate material to the first air line, the first air line configured to convey one-third of the 1.5 units of the particulate material to the outermost outlet and two-thirds of the 1.5 units of the particulate material to the penultimate outlet, a second air line connecting the metering device to the innermost outlet and the pair of interior outlets, the metering device supplying 2.5 units of the particulate material to the second air line, the second air line configured to convey one-fifth of the 2.5 units of the particulate material to the innermost outlet and two-fifths of the 2.5 units of the particulate material to each outlet of the pair of interior outlets.

There is also provided an air-boom spreader for spreading particulate material on a field, the spreader comprising: a hopper for containing the particulate material; a metering device for partitioning the particulate material, the metering device comprising first and second metering elements, each metering element receiving the particulate material from the hopper, and first and second sluice boxes, the first sluice box having a first plurality of sluices therein that receive the particulate material from the first metering element, the second sluice box having a second plurality of sluices therein that receive the particulate material from the second metering element; and, a boom transversely extendible in opposite transverse directions distally from the metering device substantially non-parallel to a direction of travel of the spreader and substantially non-perpendicular to the field, the boom comprising a plurality of outlets transversely spaced-apart in a direction perpendicular to the direction of travel of the spreader, the plurality of outlets comprising a first pair of distal-most outlets situated on a first side of the spreader, the first pair of distal-most outlets comprising a first outermost outlet and a first penultimate outlet, a second pair of distal-most outlets situated on a second side of the spreader, the second pair of distal-most outlets comprising a second outermost outlet and a second penultimate outlet, a center outlet situated over a central travel line of the spreader, a first pair of interior outlets situated between the first pair of distal-most outlets and the center outlet, a second pair of interior outlets situated between the second pair of outermost outlets and the center outlet, and a plurality of air lines connecting the first and second plurality of sluices to the plurality of outlets for conveying the particulate material in an air stream to the plurality of outlets, the plurality of air lines comprising a first outermost-extending air line connecting a first outermost-supplying sluice situated among the first plurality of sluices to the first pair of distal-most outlets, the first outermost-supplying sluice supplying a first 1.5 units of the particulate material to the first outermost-extending air line, the first outermost-extending air line configured to convey one-third of the first 1.5 units of the particulate material to the first outermost outlet and two-thirds of the first 1.5 units of the particulate material to the first penultimate outlet, a second outermost-extending air line connecting a second outermost-supplying sluice situated among the second plurality of sluices to the second pair of distal-most outlets, the second outermost-supplying sluice supplying a second 1.5 units of the particulate material to the second outermost-extending air line, the second outermost-extending air line configured to convey one-third of the second 1.5 units of the particulate material to the second outermost outlet and two-thirds of the second 1.5 units of the particulate material to the second penultimate outlet, a first centrally-extending air line connecting a first centrally-supplying sluice situated among the first plurality of sluices to the center outlet and the first pair of interior outlets, the first centrally-supplying sluice supplying a first 2.5 units of the particulate material to the first centrally-extending air line, the first centrally-extending air line configured to convey one-fifth of the first 2.5 units of the particulate material to the center outlet and two-fifths of the first 2.5 units of the particulate material to each outlet of the first pair of interior outlets, and a second centrally-extending air line connecting a second centrally-supplying sluice situated among the second plurality of sluices to the center outlet and the second pair of interior outlets, the second centrally-supplying sluice supplying a second 2.5 units of the particulate material to the second centrally-extending air line, the second centrally-extending air line configured to convey one-fifth of the second 2.5 units of the particulate material to the center outlet and two-fifths of the second 2.5 units of the particulate material to each outlet of the second pair of interior outlets.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 6 depicts a top rear perspective view of sluice boxes and air manifold of the spreader of FIG. 2 without upper funnel portions on the sluice boxes;

FIG. 7 depicts a top front perspective view of FIG. 6;

FIG. 8 depicts a rear view of FIG. 6;

FIG. 9 depicts a bottom view of FIG. 6;

DETAILED DESCRIPTION

Figure 1:
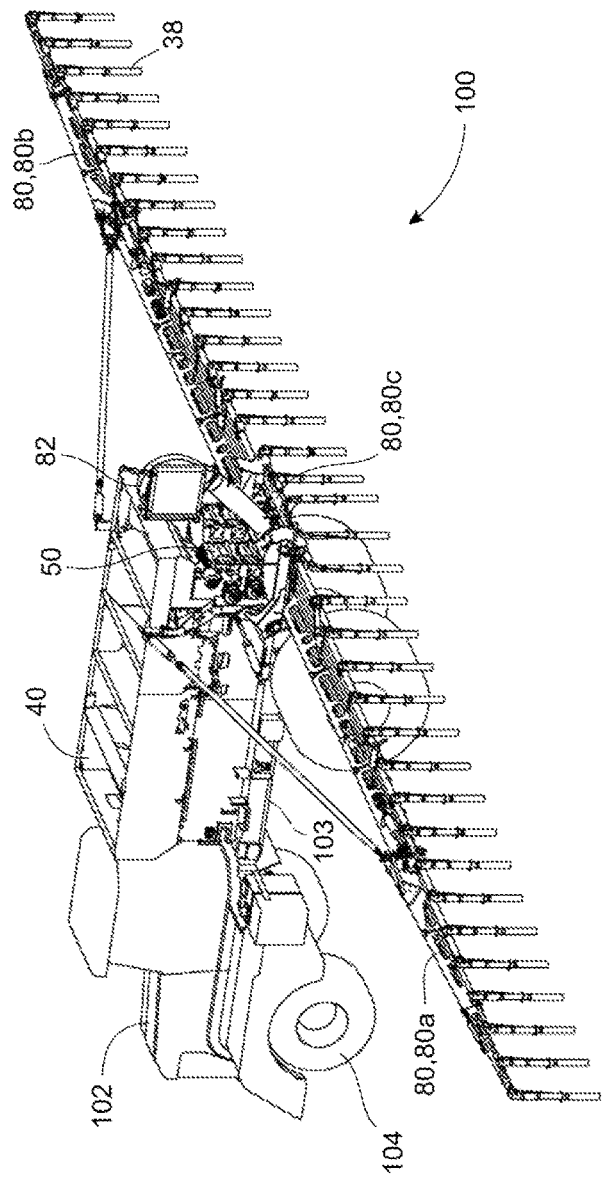
FIG. 1 depicts a rear perspective view of one embodiment of an air-boom spreader of the present invention.
Figure 2:
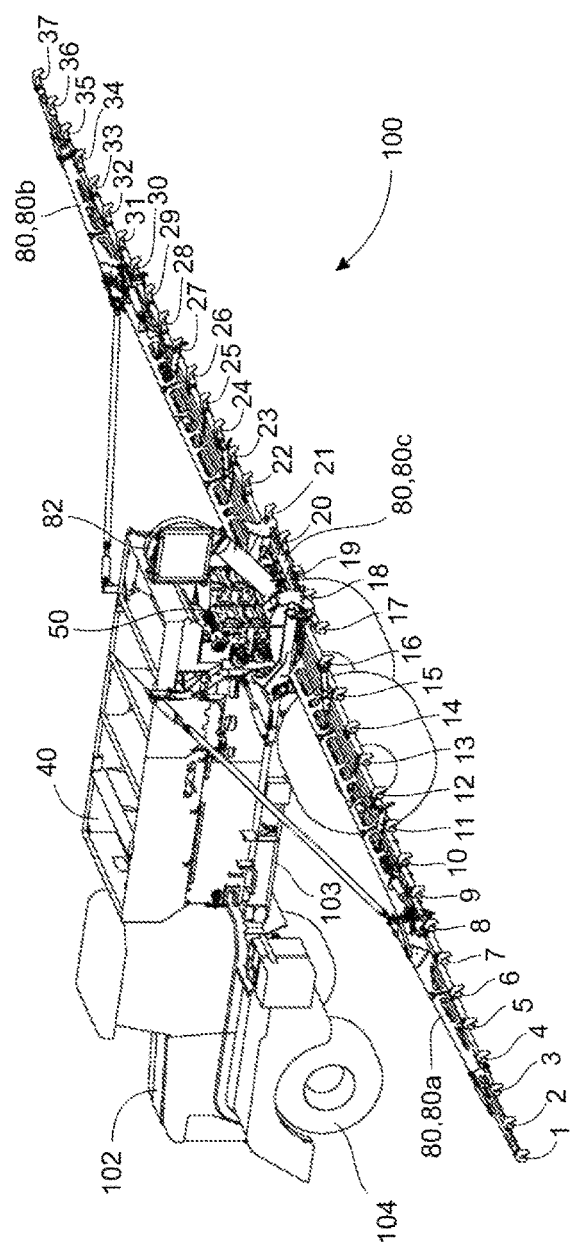
FIG. 2 depicts the spreader of FIG. 1 without drop tubes.

The present invention provides an air-boom spreader and a method for applying the same amount of a particulate material to all mid-rows between crop rows in a field while the spreader is tramlining in the field; that is, while the spreader is being driven in the field on the same driving lines used for planting the crop rows. The air-boom spreader works well for all boom spans, even booms with a total boom span of greater than 60 feet, for example a boom span between 80 feet and 100 feet (e.g. 90 feet). The particulate material may be a solid agricultural product, for example fertilizer, a micronutrient, a granular herbicide, a cover crop seed for interrow seeding or any mixture thereof. The particulate material is preferably a post-planting product.

The spreader may be self-propelled, mounted on a prime mover (e.g. a truck or tractor) or towed behind a prime mover. The spreader comprises a hopper for containing the particulate material, a metering device for receiving the particulate material from the hopper, a boom, a plurality of outlets transversely spaced-apart on the boom in a direction perpendicular to the direction of travel of the spreader and a plurality of air lines connecting the metering device to the plurality of outlets so that the particulate material can be conveyed from the metering device to the plurality outlets to be dispensed to the mid-rows between the crop rows in the field. The spreader may further comprise a blower in fluid communication with the plurality of air lines for providing an air stream in the plurality of air lines to convey the particulate material through the air lines.

The boom is extendible transversely from metering device substantially non-parallel to a direction of travel of the spreader and substantially non-perpendicular to the field. The boom may comprise one or more than one boom section. The boom may be transversely extendible to one or both sides of spreader in opposite transverse directions from the spreader.

The metering device preferably comprises a metering element and a plurality of sluices, the metering element receiving the particulate material from the hopper and the plurality of sluices receiving the particulate material from the metering element. The plurality of sluices is preferably housed in a sluice box. The metering device may comprise one or more metering elements. The metering device may comprise one or more plurality of sluices. In some embodiments, the metering device may comprise two or more metering elements. In some embodiments, the metering device may comprise two or more plurality of sluices. Where the metering device comprises more than one metering element, the metering elements may be controlled together to supply the particulate material to sluice boxes at the same rate, or may be independently controllable to independently supply the particulate material to sluice boxes at the same rate or at different rates as desired, each sluice box housing its own plurality of sluices. For example, one or more metering elements may be turned completely off while one or more other metering elements may be on.

The metering element may comprise an endless belt or a set of meter rollers. Where there is more than one metering element, the metering elements may be the same type or different types of metering elements. Endless belts may be independently controllable using dedicated motors, while sets of meter rollers may be independently controllable using dedicated clutches to engage and disengage the sets of meter rollers.

The plurality of outlets comprises a minimum of five outlets including an innermost outlet, an outermost outlet and at least three other outlets between the innermost outlet and the outermost outlet. The innermost outlet and the outermost outlet are supplied with half as much of the particulate material as the at least three other outlets so that while tramlining in the field, the spreader can dispense the same amount of the particulate material to all of the mid-rows. The innermost outlet is preferably over a mid-row on a central travel line of the spreader, while the outermost outlet is over an outermost mid-row while the spreader is being driven in the field.

It is of special note that there are more than twice as many outlets as there are sluices. Thus, each sluice supplies the particulate material to at least two of the plurality of outlets. It has been found that supplying the outermost outlet and a penultimate outlet with particulate material from the same sluice, and by supplying the innermost outlet and a pair of interior outlets from the same sluice, the spreader is configured to evenly distribute the particulate material to the outlets at both the distal and proximal ends of the boom without plugging the air lines at the proximal end. The three other outlets thus comprise the pair of interior outlets and the penultimate outlet, and the pair of interior outlets are between the penultimate outlet and the innermost outlet. Such an arrangement permits using a longer boom (e.g. greater than 60 feet total span) without unduly affecting the evenness of particulate material distribution along the entire span of the boom so that each mid-row always receives the same amount of particulate material.

In order for the sluices to supply more than one outlet, the air lines leading from the sluices to the outlets are provided with flow dividers. Flow dividers for particulate materials in air lines are generally known in the art. In the present spreader, a first flow divider in a first air line that conveys 1.5 units of the particulate from an outermost-supplying sluice to the outermost and penultimate outlets is used to divide the 1.5 units of the particulate into a one-third portion and a two-thirds portion, the one-third portion being conveyed to the outermost outlet and the two-thirds portion being conveyed to the penultimate outlet so that the outermost outlet dispenses 0.5 units of the particulate material while the penultimate outlet dispenses 1 unit of the particulate material. Further, second and third flow dividers in a second air line that conveys 2.5 units of the particulate from another sluice to the innermost outlet and the pair of interior outlets are used to properly divide the particulate material. The second flow divider divides the 2.5 units of the particulate material into a one-fifth portion conveyed to the innermost outlet and a four-fifths portion conveyed to the pair of interior outlets. The third flow divider divides the four-fifths portion into two two-fifths portions to each of the outlets of the pair of interior outlets. In this manner, the innermost outlet dispenses 0.5 units of the particulate material while each of the outlets of the pair of interior outlets dispenses 1 unit of the particulate material.

Where the boom is extendible to both sides of the spreader in the opposite transverse directions from the spreader, the innermost outlet may be termed a center outlet. In such an arrangement, a first centrally-extending air line supplied by a first centrally-supplying sluice of the first sluice box and a second centrally-extending air-line supplied by a second centrally-supplying sluice of the second sluice box both convey particulate material to the center outlet so that the center outlet dispenses 1 unit of the particulate material to the mid-row on the central travel line of the spreader.

In addition to at least three other outlets (i.e. the penultimate outlet and the pair of interior outlets), the plurality of outlets preferably further comprises at least one further pair of other outlets situated on the boom. The at least one further pair of other outlets may be situated between the pair of interior outlets and the penultimate outlet or between the pair of interior outlets and the innermost outlet. However, for efficient use of the air lines, the at least one further pair of other outlets is preferably situated between the pair of interior outlets and the penultimate outlet.

The total number of sluices and outlets depends on the desired boom span. Preferably, the spreader comprises a total of at least 7 sluices and 15 outlets. In one embodiment, the spreader comprises a total of at least 8 sluices and 17 outlets. In other embodiments, especially where the boom is extendible to both transverse sides of the spreader, the spreader comprises a total of at least 16 sluices and 33 outlets, or a total of 18 sluices and the plurality of outlets comprises a total of 37 outlets.

The use of the term "unit" throughout the specification refers to a single quantity regarded as a whole for the amount of particulate material that is desired to be dispensed through one outlet in order to deliver the particulate material at a desired rate (i.e. weight per area) to each mid-row in the field in a single pass. Further, each individual outlet could be arranged as a plurality of sub-outlets, provided the sub-outlets of an individual outlet dispense the particulate material to the same mid-row in the field.

With reference to FIG. 1 to FIG. 17, one embodiment of an air-boom spreader 100 is illustrated. The spreader 100 comprises a prime mover, for example a truck 102, a hopper 40 supported on a chassis 103 of the truck 102, a metering device 50 mounted on the bed of the truck 102 at a rear of the truck 102 and an air-boom 80 mounted on the bed of the truck 102 at the rear of the truck 102. The air-boom 80 has a total span of about 90 feet and comprises a first boom section 80*a*, a second boom section 80*b*, and a central boom section 80*c*, the first boom section 80*a* extendible transversely left from the metering device 50 and the second boom section 80*b* extendible transversely right from the metering device 50. The boom sections 80*a*, 80*b* have proximal and distal ends, whereby the proximal ends are closer to the metering device than the distal ends. In this embodiment, the air-boom 80 is substantially perpendicular to a direction of travel of the truck 102 and substantially parallel to a field during operation of the spreader 100. The boom sections 80*a*, 80*b* are foldable through a substantially horizontal plane so that the boom sections 80*a*, 80*b* are substantially parallel to the direction of travel of the truck 102 during transportation along a roadway. The truck 102 has wheels 104 (only one labeled) for driving in fields and on roadways.

In the illustrated embodiment, the metering device 50 comprises sluice boxes, which comprise a first sluice box 53 and a second sluice box 54. The metering device 50 further comprises metering elements. The metering elements comprise a first set of meter rollers 51 and a second set of meter rollers 52 above the sluice boxes 53, 54, respectively, and four endless belts 56*a*, 56*b*, 56*c*, 56*d* behind the sluice boxes 53, 54. The endless belts 56*a*, 56*b*, 56*c*, 56*d* comprise a first upper endless belt 56*a*, a first lower endless belt 56*b*, a second upper endless belt 56*c* and a second lower endless belt 56*d*. The first and second sets of meter rollers 51, 52 are situated to deliver particulate material to the sluice boxes 53, 54, respectively. The first upper and first lower endless belts 56*a*, 56*b* are situated to deliver particulate material to the first sluice box 53. The second upper and second lower endless belts 56*c*, 56*d* are situated to deliver particulate material to the second sluice box 54.

The sets of meter rollers 51, 52 and the four endless belts 56*a*, 56*b*, 56*c*, 56*d* receive particulate material from the hopper 40, the endless belts 56*a*, 56*b*, 56*c*, 56*d* extending into the hopper 40. Particulate agricultural material contained in the hopper 40 is supplied to the sets of meter rollers 51, 52 and the endless belts 56*a*, 56*b*, 56*c*, 56*d* by gravity. The sets of meter rollers 51, 52 are driven by a common motor, but are independently controllable by dedicated clutches, which engage and disengage their respective sets of meter rollers 51, 52 to turn the sets of meter rollers 51, 52 on and off. The endless belts 56*a*, 56*b*, 56*c*, 56*d* are each independently controlled by dedicated motors 57*a*, 57*b*, 57*c*, 57*d*, respectively. Therefore, one side or the other of the metering device 50 may be shut off to permit distribution of particulate material to only one side of the spreader 100, if desired.

On a given side of the metering device 50, one or more of the metering elements may be used to deliver the particulate material to the sluice boxes. For example, the first and second sluice boxes 53, 54 may receive the particulate material from the first and second sets of meter rollers 51, 52, respectively, but not from the endless belts 56*a*, 56*b*, 56*c*, 56*d*. Any one or more of the set of meter rollers and endless belts on a given side of the metering device may be used to deliver the particulate material to the sluice box on that side. The first sluice box 53 comprises a first upper funnel portion 53*a* and a first lower funnel portion 53*b*. The second sluice box 54 comprises a second upper funnel portion 54*a* and a second lower funnel portion 54*b*. Dividing fins in the funnel portions 53*a*, 53*b* of the first sluice box 53 define 9 sluices 55*a*, 55*b*, 55*c*, 55*d*, 55*e*, 55*f*, 55*g*, 55*h*, 55*i*. Dividing fins in the funnel portions 54*a*, 54*b* of the second sluice box 54 define another 9 sluices 55*j*, 55*k*, 55*l*, 55*m*, 55*m*, 55*o*, 55*p*, 55*q*, 55*r*. The metering device 50 therefore comprises a total of 18 sluices 55*a*-55*r*. The sluices 55*i*, 55*j* are wide, being configured to supply 1.25 times as much particulate material than the sluices 55*b*-55*h* and 55*k*-55*q*. The sluices 55*a*, 55*r* are narrow being configured to supply 0.75 times as much particulate material as the sluices 55*b*-55*h* and 55*k*-55*q*.

The air-boom 80 further comprises an air manifold having a central airbox 81 for supporting various components of the air manifold and for providing air to other parts of the air manifold. The air manifold comprises 18 air lines 82*a*, 82*b*, 82*c*, 82*d*, 82*e*, 82*f*, 82*g*, 82*h*, 82*i*, 82*j*, 82*k*, 82*l*, 82*m*, 82*n*, 82*o*, 82*p*, 82*q*, 82*r* supported on and in fluid communication with the airbox 81. The air lines 82*a*-82*r* are supplied with particulate material from the 18 sluices 55*a*-55*r*, respectively. Defining 1 unit of particulate material as described above: the sluices 55*a* and 55*r* supply 1.5 units of the particulate material to the air lines 82*a* and 82*r*, respectively; the sluices 55*i* and 55*j* supply 2.5 units of the particulate material to the air lines 82*i* and 82*j*, respectively; and, the sluices 55*b*, 55*c*, 55*d*, 55*e*, 55*f*, 55*g*, 55*h*, 55*k*, 55*l*, 55*m*, 55*m*, 55*o*, 55*p*, 55*q* supply 2 units of the particulate material to the air lines 82*b*, 82*c*, 82*d*, 82*e*, 82*f*, 82*g*, 82*h*, 82*k*, 82*l*, 82*m*, 82*n*, 82*o*, 82*p*, 82*q*, respectively.

Figure 3A:
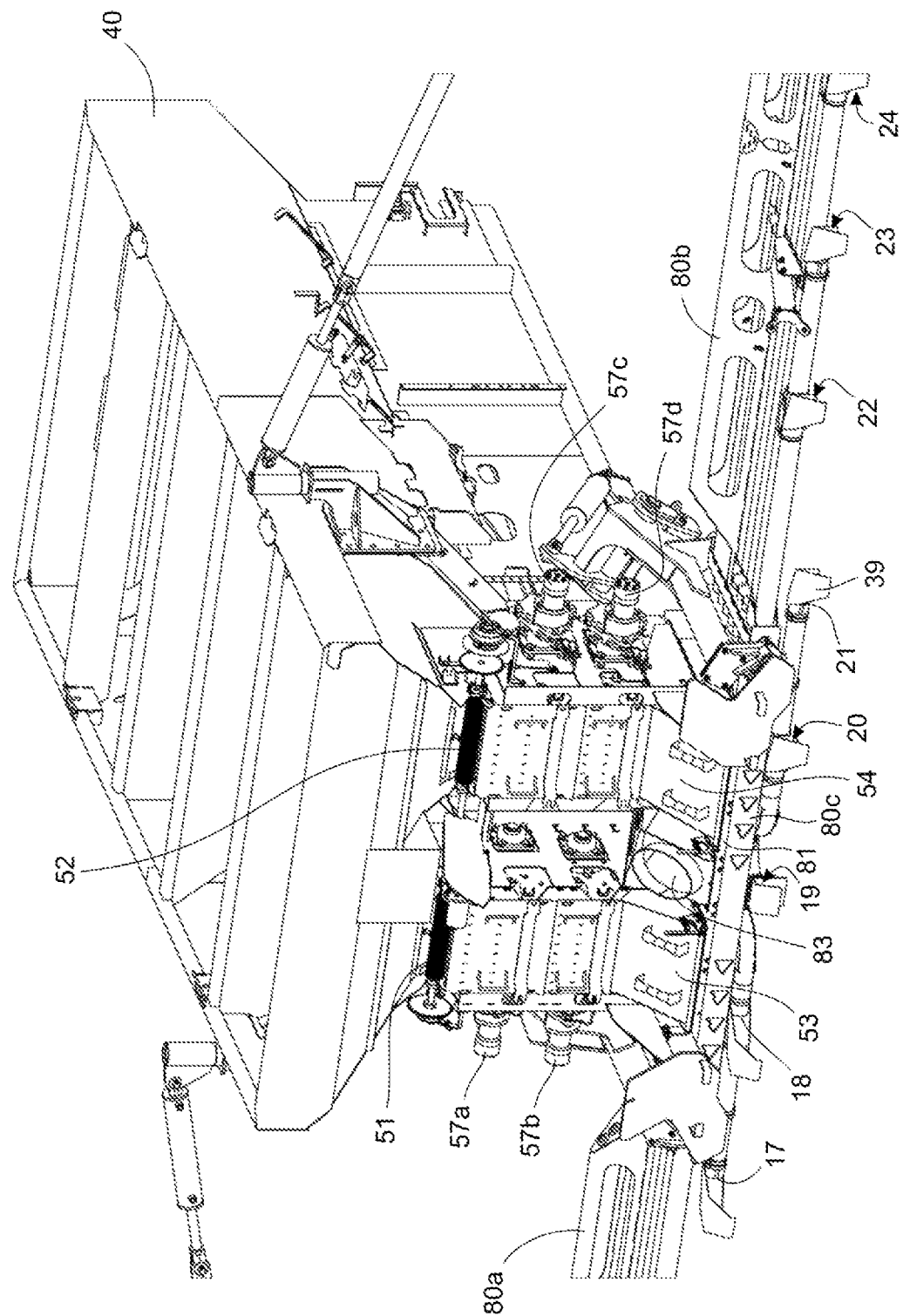
FIG. 3A depicts a magnified rear perspective view of a central portion of the spreader of FIG. 2.
Figure 3B:
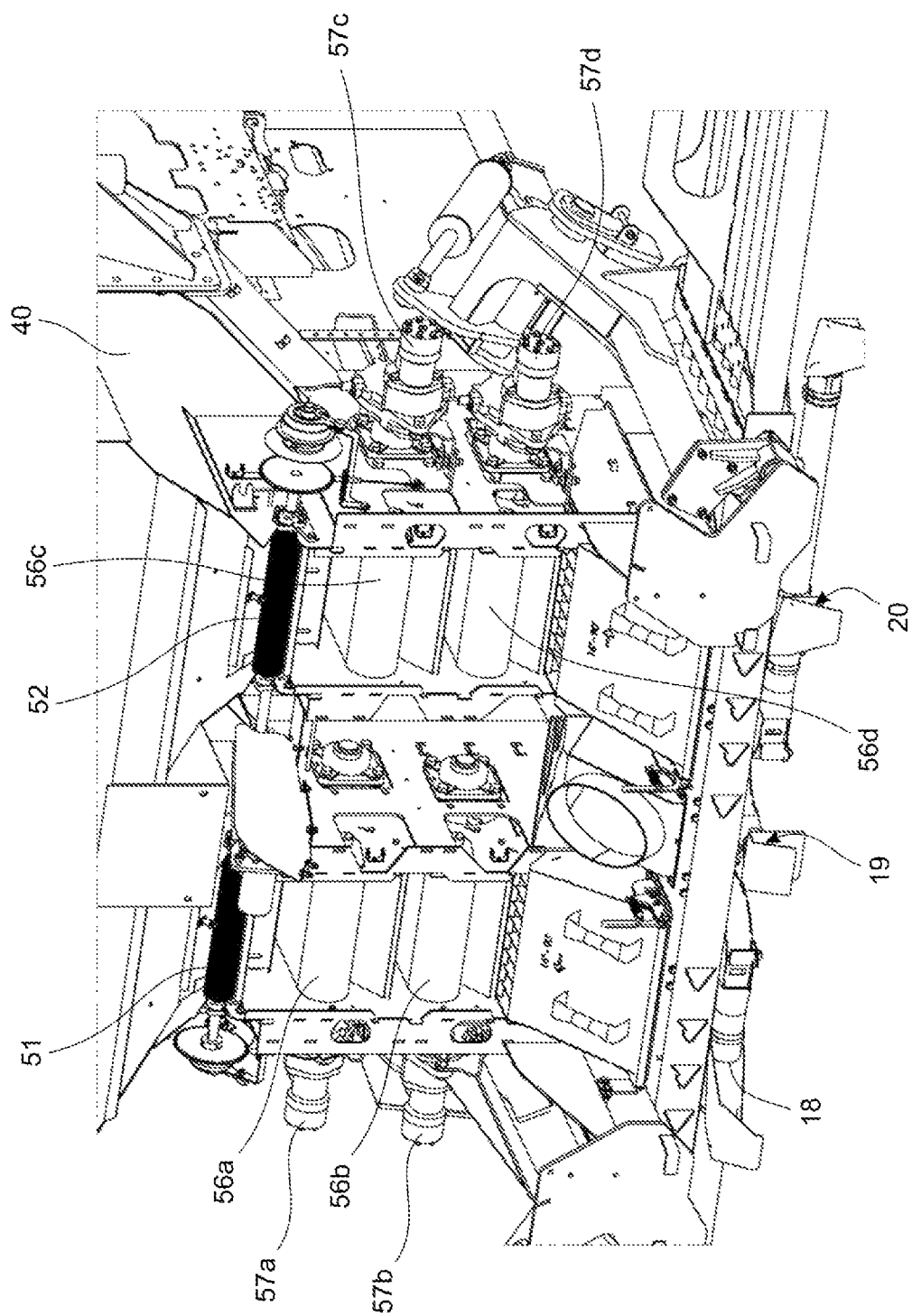
FIG. 3B depicts a magnified rear perspective view of a central portion of the spreader of FIG. 2 without sluice boxes.
Figure 3C:
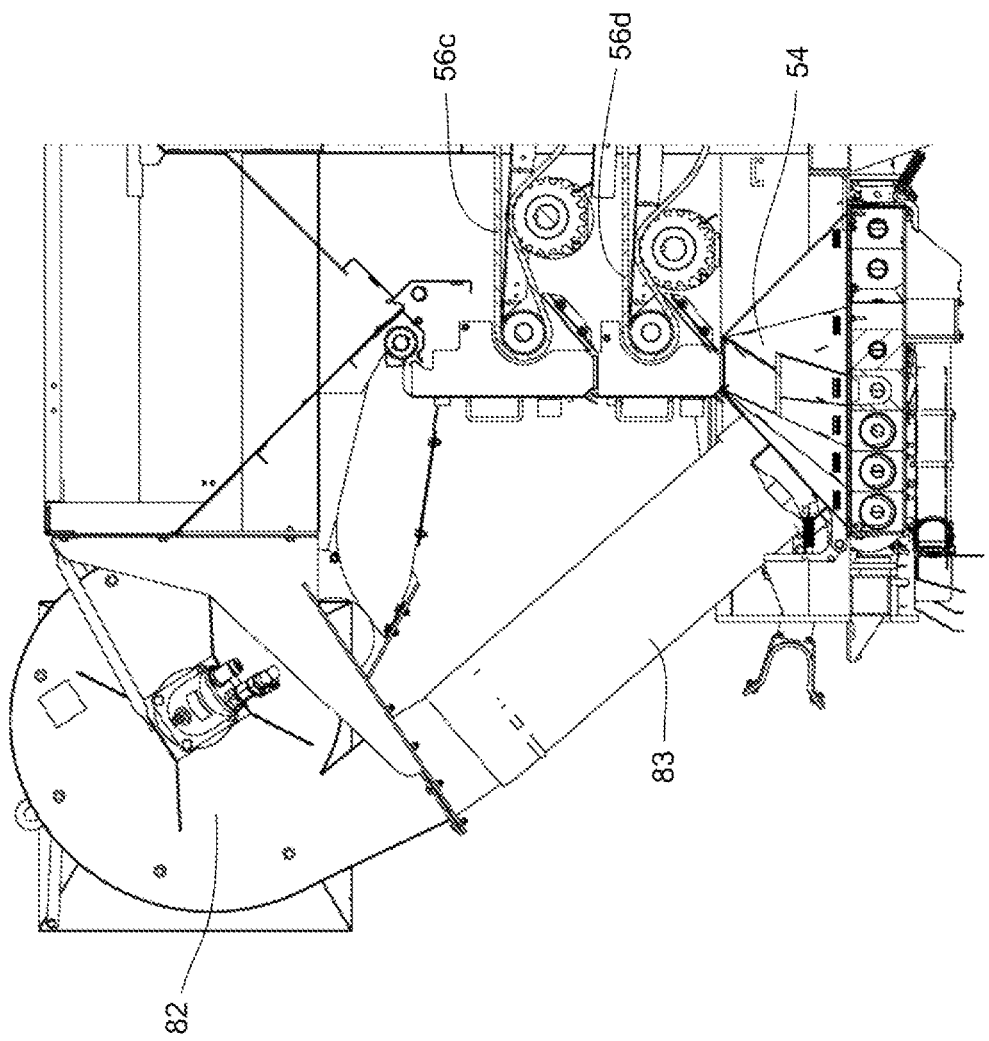
FIG. 3C depicts a magnified side view of a cut-away of a rear portion of the spreader of FIG. 2.
Figure 4:
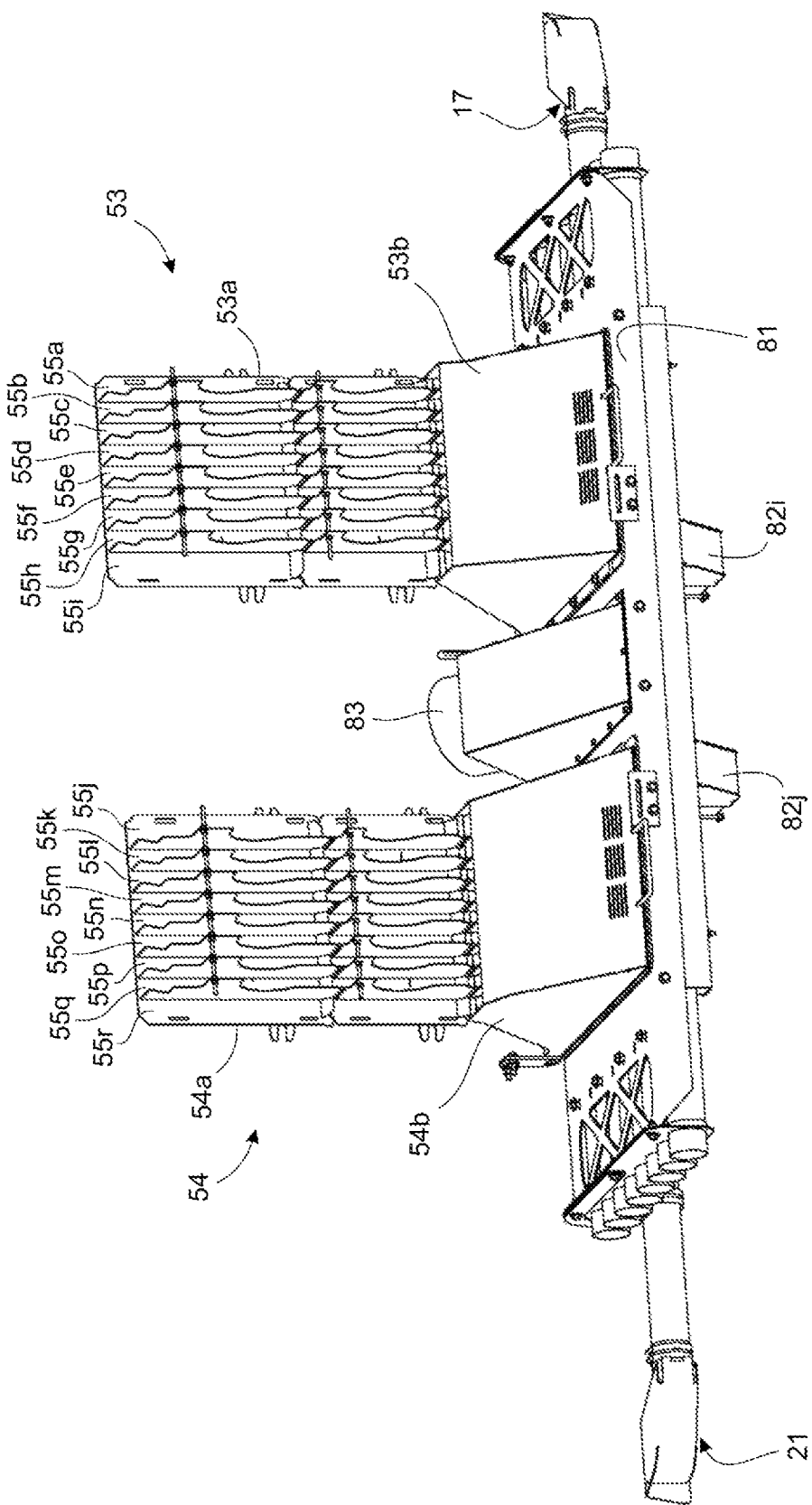
FIG. 4 depicts a top front perspective view of sluice boxes and air manifold of the spreader of FIG. 2.
Figure 5:
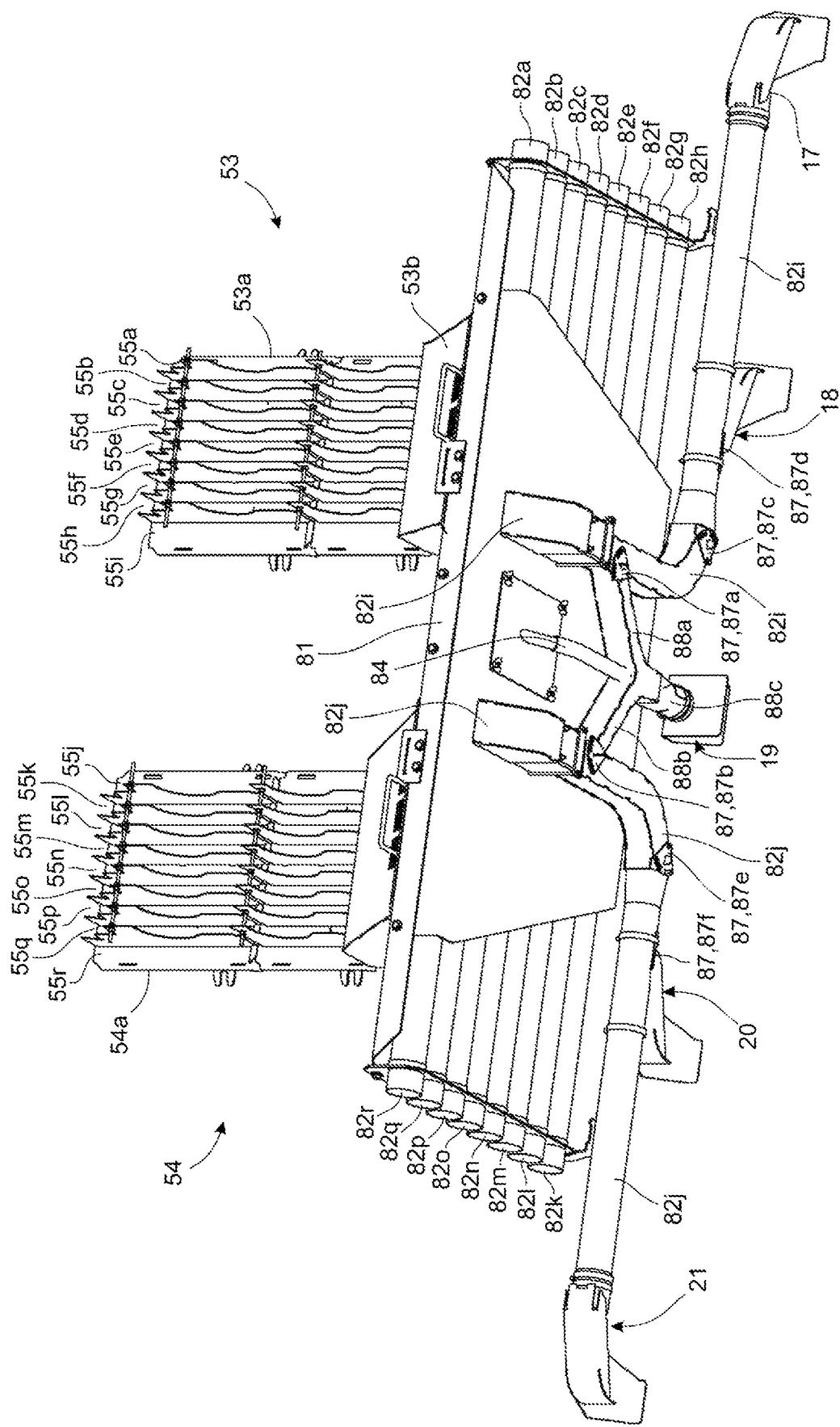
FIG. 5 depicts a bottom front perspective view of FIG. 4.
Figure 10:
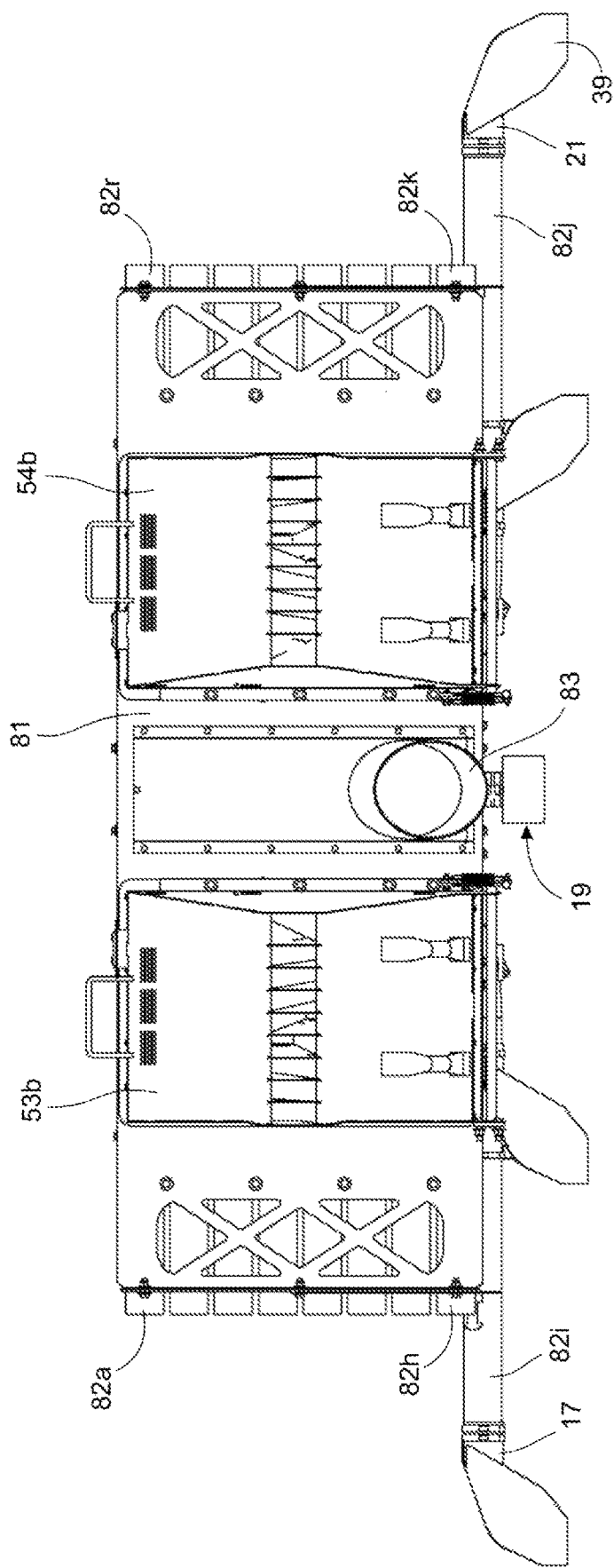
FIG. 10 depicts a top view of FIG. 6.
Figure 11:
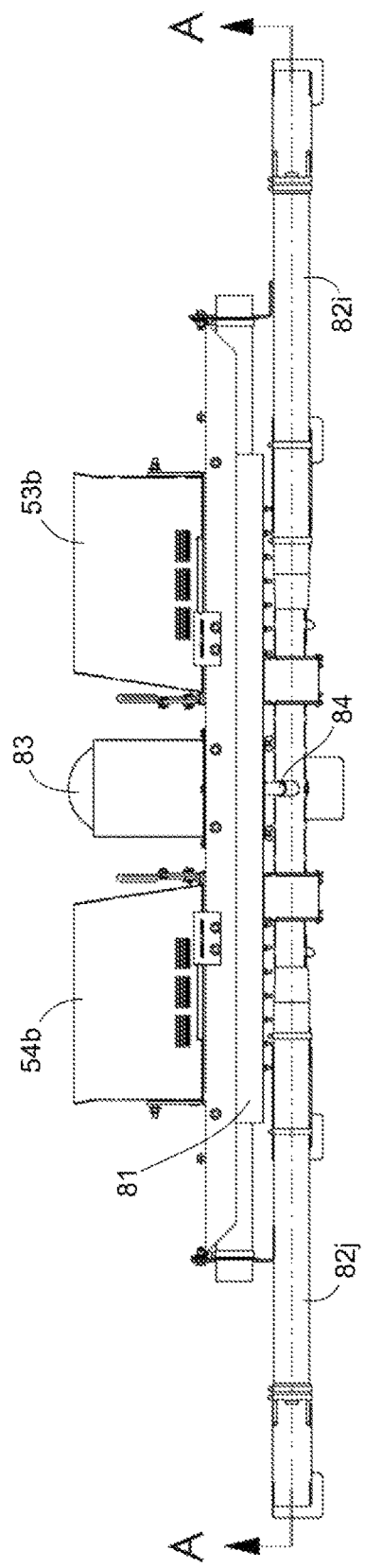
FIG. 11 depicts a front view of FIG. 6.

The air lines 82*a*-82*r* of the air-boom 80 are equipped with a total of 37 outlets 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37. The outlets 1-37 may be equipped with drop tubes 38 (only one labeled) and/or with deflectors 39 (see FIG. 3A, only one labeled) to help guide the particulate material from the outlets 1-37 to the field below. The 18 air lines 82*a*-82*r* convey the particulate material to the 37 outlets 1-37 in an air stream. The air stream is generated by a blower 82 that blows air through a main duct 83 into the airbox 81 and then into the air lines 82*a*-82*r*. The air manifold further comprises a booster hose 84 in fluid communication with airbox 81 and the outlet 19 to provide extra air flow through the outlet 19 to help prevent plugging of the outlet 19 during operation. The booster hose may be omitted if there is sufficient air flow without the booster hose.

Figure 16:
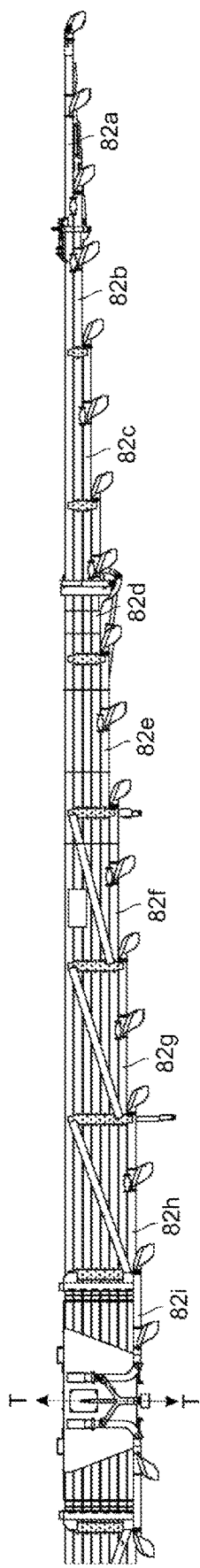
FIG. 16 depicts a bottom view of a left side of a boom of the spreader of FIG. 2 at a scale of 1:56.

The outlets 1 and 2 are a pair of distal-most outlets on the left side of the spreader 100. The outlets 36 and 37 are another pair of distal-most outlets on the right side of the spreader 100. The outlet 19 is a center outlet located over a central travel line T-T (see FIG. 16) of the spreader 100. The outlets 17 and 18 are a pair of interior outlets on the left side of the spreader 100. The outlets 20 and 21 are another pair of interior outlets on the right side of the spreader 100. The other outlets 3, 4, 5, 6, 7, 8, 9, 10, 11, 12, 13, 14, 15, 16, 22, 23, 24, 25, 26, 27, 28, 29, 30, 31, 32, 33, 34, 35 are paired, with outlet pairs 3/4, 5/6, 7/8, 9/10, 11/12, 13/14, 15/16 situated between the distal-most pair of outlets 1/2 and the interior pair of outlets 17/18 on the left side of the spreader 100 and outlet pairs 22/23, 24/25, 26/27, 28/29, 30/31, 32/33, 34/35 situated between the other distal-most pair of outlets 36/37 and the other interior pair of outlets 20/21 on the right side of the spreader 100.

The 16 outlet pairs 1/2, 3/4, 5/6, 7/8, 9/10, 11/12, 13/14, 15/16, 22/23, 24/25, 26/27, 28/29, 30/31, 32/33, 34/35 and 36/37 are provided with particulate material through the air lines 82*a*, 82*b*, 82*c*, 82*d*, 82*e*, 82*f*, 82*g*, 82*h*, 82*k*, 82*l*, 82*m*, 82*n*, 82*o*, 82*p*, 82*q* and 82*r*, respectively. The interior pair of outlets 17/18 and the center outlet 19 are provided with particulate material through the air line 82*i*, while the other interior pair of outlets 20/21 and the center outlet 19 are provided with particulate material through the air line 82*j*.

To ensure that the desired amount of particulate material is dispensed through each of the outlets 1-37, a plurality of flow dividers 87 are used. Additionally, to ensure that the center outlet 19 is supplied with particulate material from both the air line 82*i* and the air line 82*j*, the particulate material is diverted from the air lines 82*i* and 82*j* through branch air lines 88*a* and 88*b*, respectively.

Figure 12:
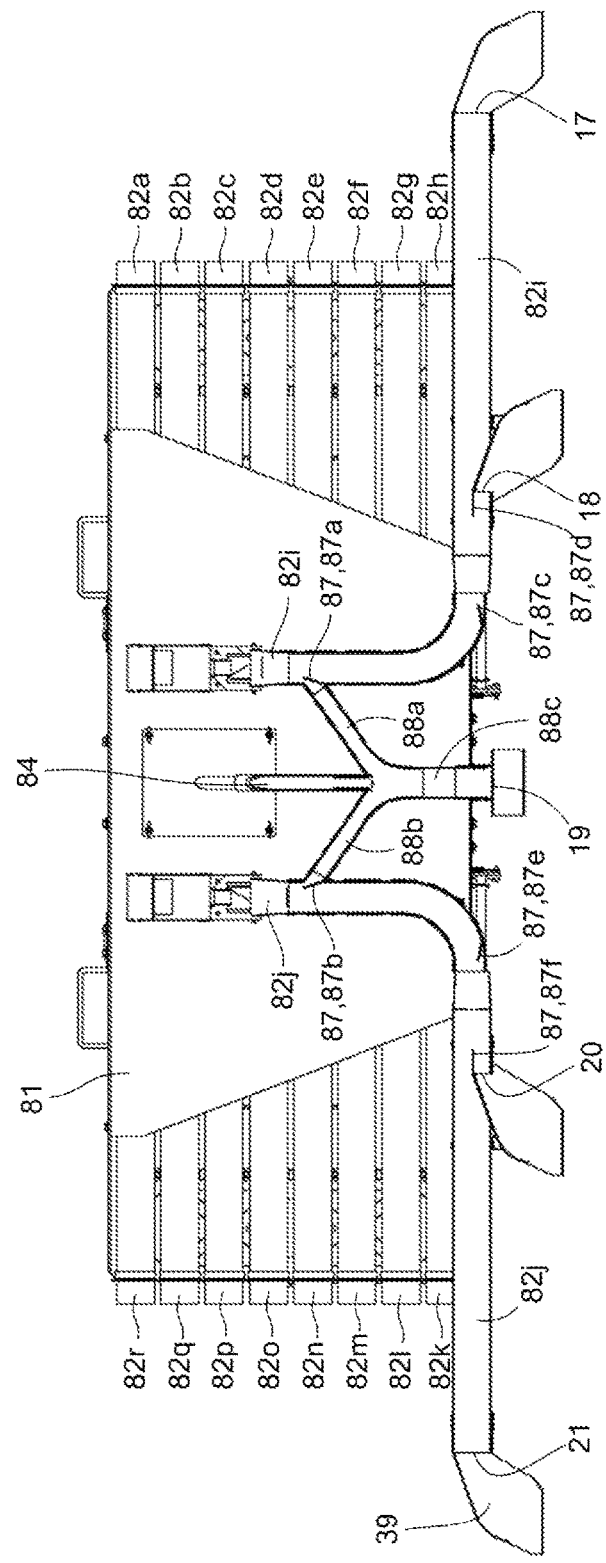
FIG. 12 depicts a sectional view through A-A in FIG. 11 at a scale of 1:12.
Figure 14:
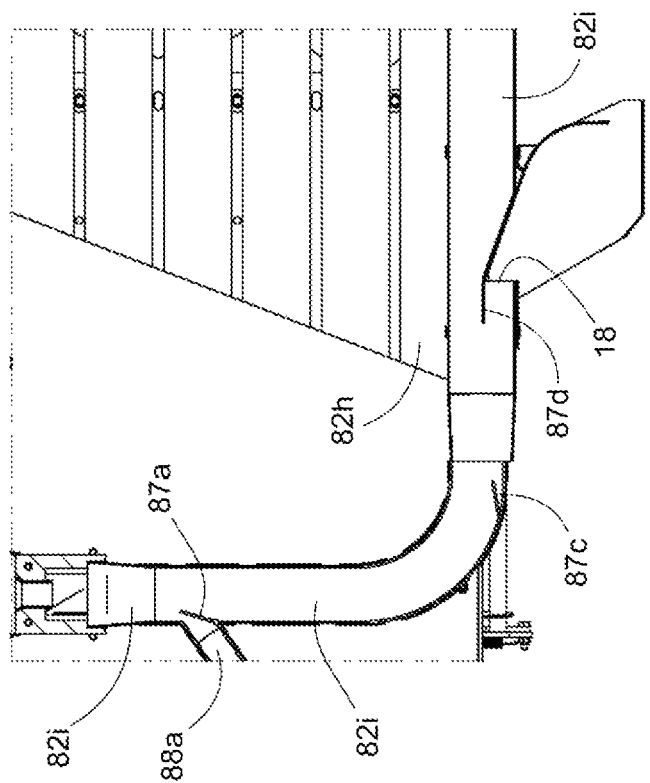
FIG. 14 depicts a magnified view of a just-off-center portion of FIG. 12.
Figure 13:
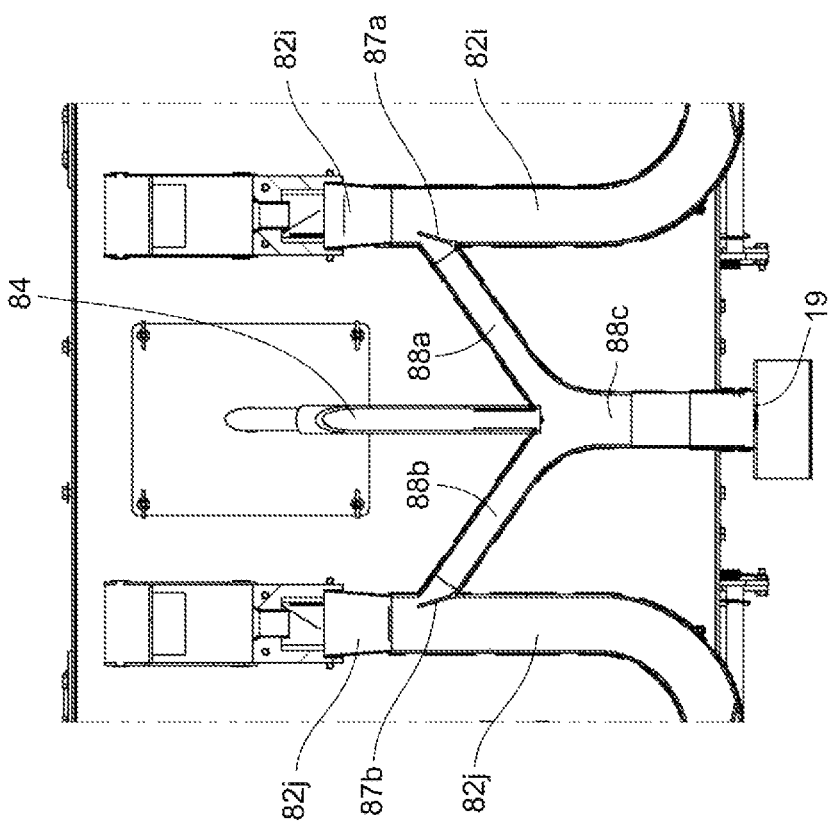
FIG. 13 depicts a magnified view of a central portion of FIG. 12.
Figure 15:
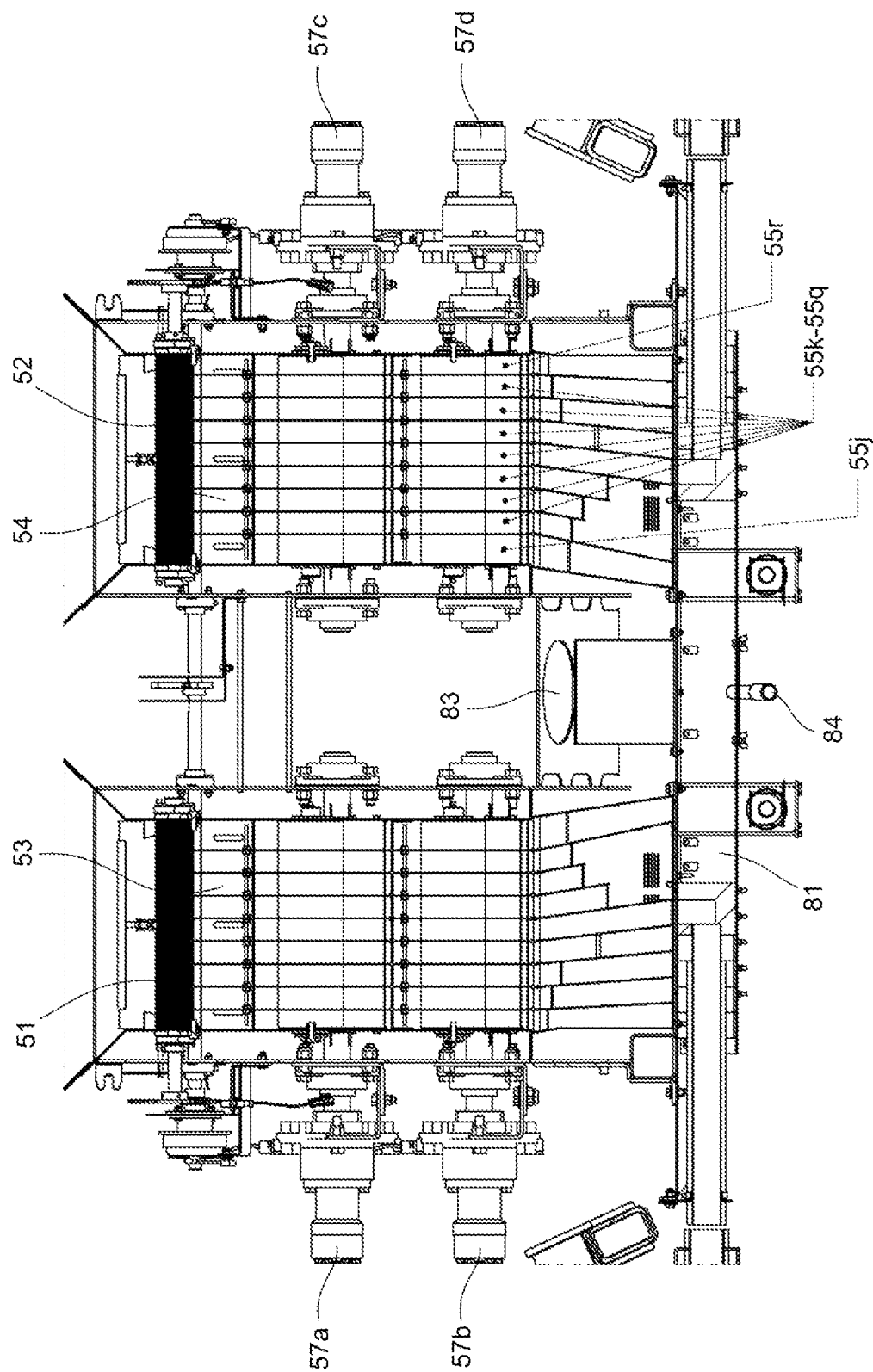
FIG. 15 depicts a rear sectional view taken vertically through the sluice boxes and air manifold depicted in FIG. 4.

As best seen in FIG. 12, FIG. 13 and FIG. 14, flow divider 87*a* in the form of an adjustable deflector located at a junction between the air line 82*i* and the branch air line 88*a* ensures that one-fifth of the 2.5 units of particulate material delivered from the sluice 55*i* to the air line 82*i* is diverted into the branch air line 88*a* while four-fifths of the 2.5 units continues through the air line 82*i*. Flow divider 87*b* in the form of an adjustable deflector located at a junction between the air line 82*j* and the branch air line 88*b* ensures that one-fifth of the 2.5 units of particulate material delivered from the sluice 55*j* to the air line 82*j* is diverted into the branch air line 88*b* while four-fifths of the 2.5 units continues through the air line 82*j*. The branch air lines 88*a* and 88*b* join at a Y-junction to form a joined branch air line 88*c*, which conveys the particulate material to the center outlet 19. Joining the branch air lines 88*a* and 88*b* combines the respective 0.5 unit of particulate material into 1 unit so that 1 unit of the particulate material is dispensed by the center outlet 19. The booster hose 84 joins to the joined branch air line 88*c* at the crook of the 'Y' to provide extra air flow from behind the particulate material flowing from the branch air lines 88*a* and 88*b* into the joined branch air line 88*c*. The 2 units of particulate material flowing through the air line 82*i* downstream of the flow divider 87*a* is further divided into two 1 unit portions with the aid of flow divider 87*c* in the form of an adjustable deflector located at a 90-degree bend in the air line 82*i* and flow divider 87*d* in the form of an adjustable deflector located at the outlet 18. In this manner, each of the outlets 17, 18 of the pair of interior outlets 17/18 dispense 1 unit of the particulate material. Likewise, the 2 units of particulate material flowing through the air line 82*j* downstream of the flow divider 87*b* is further divided into two 1 unit portions with the aid of flow divider 87*e* in the form of an adjustable deflector located at a 90-degree bend in the air line 82*j* and flow divider 87*f* in the form of an adjustable deflector located at the outlet 20. In this manner, each of the outlets 20, 21 of the pair of interior outlets 20/21 dispense 1 unit of the particulate material.

Figure 17:
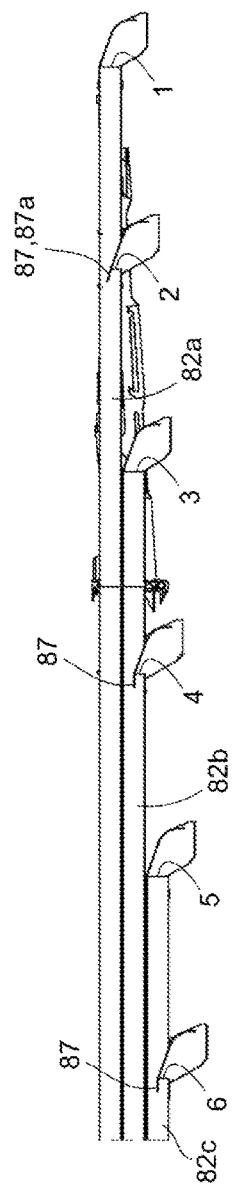
FIG. 17 depicts a magnified bottom sectional view of a left side distal end of the boom depicted in FIG. 16.

Each of the 16 air lines 82*a*, 82*b*, 82*c*, 82*d*, 82*e*, 82*f*, 82*g*, 82*h*, 82*k*, 82*l*, 82*m*, 82*n*, 82*o*, 82*p*, 82*q* and 82*r* are equipped with one flow divider 87 each in the form of an adjustable deflector located at the respective outlets 2, 4, 6, 8, 10, 12, 14, 16, 22, 24, 26, 28, 30, 32, 34 and 36. The 2 units of particulate material supplied to each of 82*b*, 82*c*, 82*d*, 82*e*, 82*f*, 82*g*, 82*h*, 82*k*, 82*l*, 82*m*, 82*n*, 82*o*, 82*p* and 82*q* are divided equally into two 1 unit portions so that each of the two outlets on a given air line dispense 1 unit of the particulate material. In outermost-extending air lines 82*a* and 82*r*, the flow divider 87 (labeled as 87*a* in FIG. 17 for the outermost-extending air line 82*a*) is adjusted to divide the supplied 1.5 units into one 0.5 unit portion and one 1 unit portion so that the penultimate outlets 2 and 36 of the distal-most pairs of outlets 1/2 and 36/37, respectively, dispense 1 unit of the particulate material while outermost outlets 1 and 37 of the distal-most pairs of outlets 1/2 and 36/37, respectively, dispense 0.5 unit of the particulate material. When tramlining through the field, the spreader 100 will dispense 1 unit of the particulate material to all mid-rows because the outermost outlets 1 and 37 will each dispense 0.5 units of the particulate material to the same outermost mid-row but on immediately subsequent passes. One or more of the flow dividers 87 may be adjustable to aid in obtaining proper distribution of the particulate material. Adjustable deflectors may be adjustable by any suitable method, for example by mechanical bending (e.g. as at 87*f*), by pivoting and clamping in place (e.g. as at 87*b*) or by sliding and clamping in place (as at 87*e*).

The arrangement of air lines 82*a*-82*r* in the central airbox 81 offers a significant advantage with respect to air flow through to the outermost outlets 1, 37 and to the central outlet 19. Air from the central airbox 81 to the center outlet 19 is not required to go through a 180° degree turn and then a 90° turn before reaching the outlet 19. Therefore, less energy is dissipated and less air is required to properly distribute the particulate material to the center outlet 19. This leaves more air to distribute the particulate material to the interior pairs of outlets 17/18 and 20/21. Plugging is avoided or reduced sufficiently and proper particulate material distribution rate is maintained at the center outlet 19 and the interior pairs of outlets 17/18 and 20/21. Further, the longest airlines, 82*a* and 82*r*, are straight having no bends to dissipate energy from the air stream, thereby providing sufficient air flow to convey the particulate material the required longer distance at the proper distribution rate.

Furthermore, use of steel tube for the airlines 82*a*-82*r*, especially the longest airlines, 82*a* and 82*r*, is more efficient. As the total boom span of the spreader increases beyond 60 feet, it becomes more undesirable to use a single steel tube to convey the particulate material to a single outlet. The extra weight of one tube per line would be difficult to manage in wider boom weldments. Supporting this extra weight would create a very heavy structure that may be either too heavy thereby reducing carrying capacity, or the boom itself may self-destruct having too much weight out too far from the hopper. By having each airline convey particulate material to two or more outlets, the amount of steel tube required is lessened, thereby reducing weight and cost of the spreader. Furthermore, having each airline convey particulate material to two or more outlets, it becomes more feasible to increase the diameter of the venturis and the airlines in the air manifold, which permits increasing flow rate of the particulate material in each airline, for example to about 120 lb/min/line, thereby successfully distributing the particulate material at a higher rate at the same or lower vehicle speed, e.g. 1200 lb/acre at 10 mph, further out from the vehicle.

Figure 18:
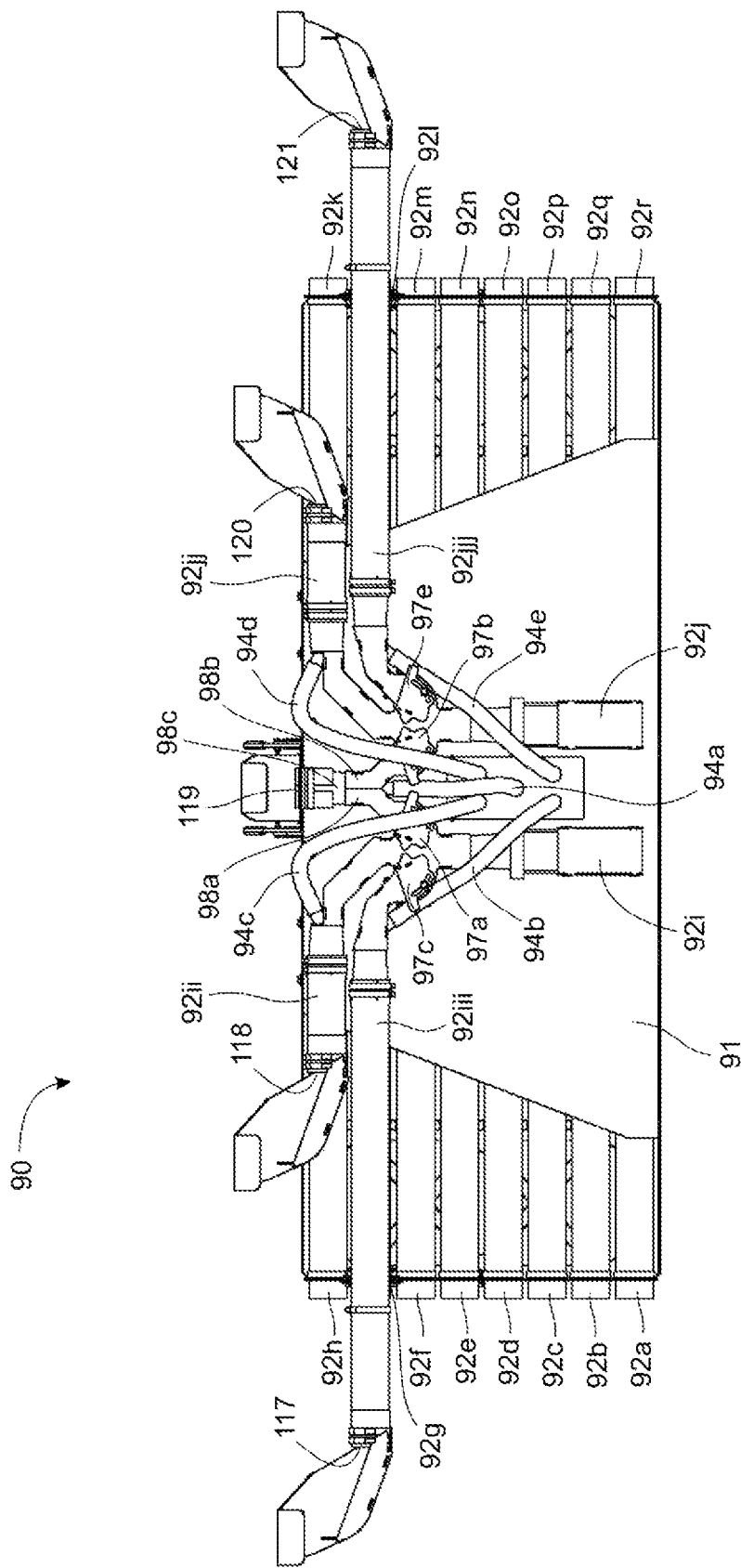
FIG. 18 depicts a bottom view of a central portion of an air-boom spreader having an alternate embodiment of an air manifold; and, FIG. 19 depicts a magnified view of a cross-section of a just-off-center portion of the air-boom spreader of FIG. 18.
Figure 19:
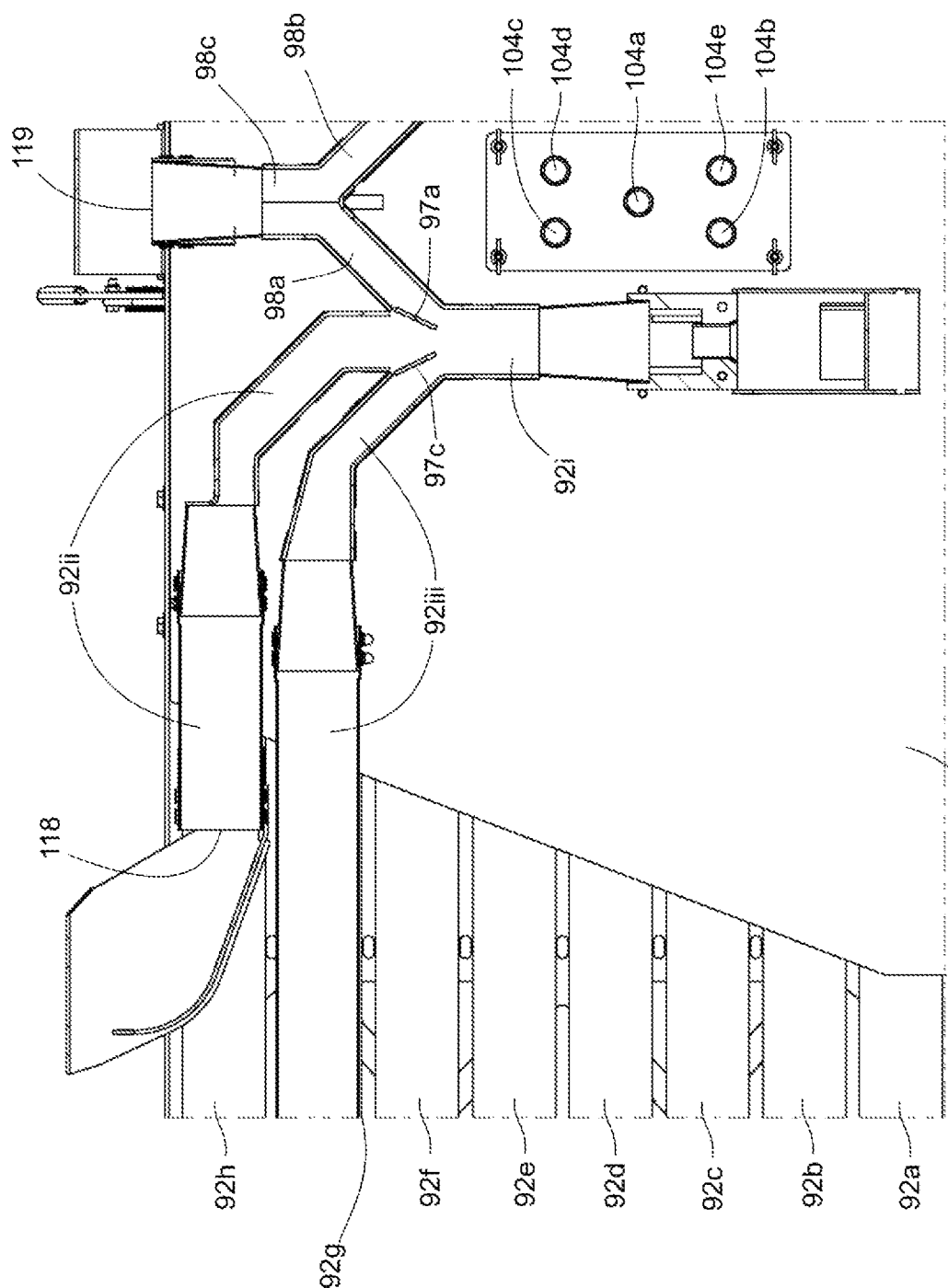

As seen in FIG. 18 and FIG. 19, in an alternate embodiment, an air-boom 90 of a spreader of the present invention comprises structures similar to the air-boom 80 described above including an alternate embodiment of an air manifold comprising a central airbox 91, for supporting various components of the air manifold and for providing air to other parts of the air manifold. The air manifold comprises 20 air lines 92*a*, 92*b*, 92*c*, 92*d*, 92*e*, 92*f*, 92*g*, 92*h*, 92*ii*, 92*iii*, 92*jj*, 92*jjj*, 92*k*, 92*l*, 92*m*, 92*n*, 92*o*, 92*p*, 92*q*, 92*r* supported on and in fluid communication with the airbox 91. The air lines 92*ii* and 92*iii* are situated underneath the air lines 92*h* and 92*g*, respectively, while likewise the air lines 92*jj* and 92*jjj* are situated underneath the air lines 92*k* and 92*l*, respectively, during operation of the air-boom 90. Thus, most of the air lines are situated and extend transversely in the same horizontal plane, while the air lines 92*ii*, 92*iii*, 92*jj* and 92*jjj* are situated and extend transversely in a horizontal plane underneath the other air lines during operation of the air-boom 90.

All twenty of the air lines 92*a*-92*r* are supplied with particulate material from 18 sluices. To this end, the air lines 92*ii* and 92*iii* are split from a single feed air line 92*i*, the feed air line 92*i* receiving particulate material from one of the sluices. Likewise, the air lines 92*jj* and 92*jjj* are split from a single feed air line 92*j*, the feed air line 92*j* receiving particulate material from one of the sluices. As described above, the air lines 92*a* and 92*r* each receive 1.5 units of particulate material, the air lines 92*b*, 92*c*, 92*d*, 92*e*, 92*f*, 92*g*, 92*h*, 92*k*, 92*l*, 92*m*, 92*n*, 92*o*, 92*p*, 92*q* each receive 2 units of the particulate material, and the air lines 92*i* and 92*j* each receive 2.5 units of the particulate material. Operation of the air-boom 90 is the same as air-boom 80 except for the following.

Outlets 117 and 118 are a pair of interior outlets on the left side, but instead of being on the same transversely extending interior air line, the outlets 117 and 118 are on different interior air lines 92*iii* and 92*ii*, respectively. Likewise, outlets 120 and 121 are a pair of interior outlets on the right side, but instead of being on the same transversely extending interior air line, the outlets 120 and 121 are on different interior air lines 92*jj* and 92*jjj*, respectively.

Further, in order for the interior outlets 117, 118, 120 and 121 as well as a central outlet 119 to each receive 1 unit of the particulate material, a somewhat different flow dividing arrangement is utilized. With particular reference to FIG. 19, the single feed air line 92*i* receives 2.5 units of the particulate material. The single feed air line 92*i* splits into the air lines 92*ii* and 92*iii* before the air lines 92*ii* and 92*iii* bend to extend transversely. The splitting of the single feed air line 92*i* into the air lines 92*ii* and 92*iii* is proximate or at the same location in the single feed air line 92*i* as a junction with a branch air line 98*a* that carries the particulate material to the central outlet 119. The single feed air line 92*i* is equipped with two flow dividers 97*a* and 97*c* in the form of adjustable deflectors. The flow divider 97*a* is located at the junction between the single feed air line 92*i* and the branch air line 98*a* to ensure that one-fifth of the 2.5 units of particulate material is diverted into the branch air line 98*a*. The flow divider 97*c* is located at the junction between the single feed air line 92*i* and the air lines 92*ii* and 92*iii* to ensure that two-fifths of the 2.5 units of particulate material is diverted into the air line 92*ii* and that two-fifths of the 2.5 units of particulate material is diverted into the air line 92*iii*. Thus, the flow divider 97*c* is located before the bends in the air lines 92*ii* and 92*iii*. Essentially the same arrangement is provided on the right side of the air-boom 90, utilizing flow divider 97*b* to divert one-fifth of the 2.5 units of the particulate material from the single feed air line 92*j* into a branch air line 98*b*, and to divert two-fifths of the particulate material from the single feed air line 92*j* into each of the air lines 92*jj* and 92*jjj*. The two branch air lines 98*a* and 98*b* join at a Y-junction to form a joined branch air line 98*c*, which conveys the particulate material to the center outlet 119. In this manner, each of the outlets 117, 118, 119, 120 and 121 receives 1 unit of the particulate material.

Like in the air-boom 80 described above, the air manifold of the air-boom 90 further comprises a booster hose 94*a* in fluid communication with airbox 91 and the center outlet 119 through the joined branch air line 98*c* to provide extra air flow through the center outlet 119 to help prevent plugging of the center outlet 119 during operation. In the air-boom 90, four additional booster hoses 94*b*, 94*c*, 94*d* and 94*e* in fluid communication with airbox 91 and the interior outlets 117, 118, 120 and 121, respectively, through the air lines 92*iii*, 92*ii*, 92*jj* and 92*jjj*, respectively, are provided to provide extra air flow through the outlets 117, 118, 120 and 121. FIG. 19 illustrates ports 104*a*, 104*b*, 104*c*, 104*d* and 104*e* in the airbox 91 to which the booster hoses 94*a*, 94*b*, 94*c*, 94*d* and 94*e*, respectively, are connected.

The arrangement illustrated in FIG. 18 and FIG. 19 provides for even better control over the uniformity of distribution of the particulate material at the outlets, and provides better uniformity of distribution for a larger variety of particle types (e.g. particle density) and air flow rates.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. An air-boom spreader for spreading particulate material on a field, the spreader comprising:
   a hopper for containing the particulate material;
   a metering device comprising a plurality of sluices, the metering device receiving the particulate material from the hopper and partitioning the particulate material into the plurality of sluices;
   a plurality of outlets transversely spaced-apart on a boom in a direction perpendicular to the direction of travel of the spreader; and,
   a plurality of air lines connecting the plurality of sluices to the plurality of outlets for conveying the particulate material in an air stream from the plurality of sluices to the plurality of outlets,
   wherein there are more than twice as many outlets as there are sluices,
   and wherein the plurality of outlets comprises an innermost outlet, an outermost outlet and at least three other outlets between the innermost outlet and the outermost outlet whereby the innermost outlet and the outermost outlet are each supplied with half as much of the particulate material as each of the at least three other outlets.

2. The spreader of claim 1, wherein the metering device comprises one or more metering elements for receiving the particulate material from the hopper.

3. The spreader of claim 1, wherein the metering device comprises two or more metering elements for receiving the particulate material from the hopper.

4. The spreader of claim 2, wherein the one or more metering elements comprise an endless belt, a set of meter rollers or a combination of an endless belt and a set of meter rollers.

5. The spreader of claim 1, wherein the boom has a span of greater than 60 feet.

6. The spreader of claim 1, wherein the boom has a span between 80 feet and 100 feet.

7. The spreader of claim 1, wherein each sluice supplies the particulate material to at least two of the plurality of outlets.

8. The spreader of claim 1, wherein:
   the at least three other outlets comprises a first penultimate outlet adjacent the outermost outlet and a second penultimate outlet adjacent the innermost outlet; and,
   the plurality of air lines comprises
      an outermost-extending air line comprising a first flow divider to divide a first 1.5 units of the particulate material between the outermost outlet and the first penultimate outlet whereby the outermost outlet receives 0.5 units from the first 1.5 units and the first penultimate outlet receives 1.0 units from the first 1.5 units, and
      an innermost-extending air line comprising a second flow divider to divide a second 1.5 units of the particulate material between the innermost outlet and the second penultimate outlet whereby the innermost outlet receives 0.5 units from the second 1.5 units and the second penultimate outlet receives 1.0 units from the second 1.5 units.

9. The spreader of claim 1, wherein the air-boom further comprises a blower in fluid communication with the plurality of air lines for providing the air stream in the plurality of air lines.

10. The spreader of claim 1, wherein the plurality of outlets is a first plurality of outlets and the boom is a first boom that extends to a first side of the spreader,
    wherein the spreader comprises a second plurality of outlets and a second boom that extends to a second side of the spreader, the second plurality of outlets arranged on the second boom in the same manner as the first plurality of outlets is arranged on the first boom.

* * * * *